United States Patent [19]

Vanderhorst et al.

[11] 4,257,250
[45] Mar. 24, 1981

[54] KNURLING TOOL

[76] Inventors: Ed W. Vanderhorst, 6718 Whitaker Ave.; Henry L. Vanderhorst, 6536 Langdon Ave., both of Van Nuys, Calif. 91406

[21] Appl. No.: 23,569

[22] Filed: Mar. 26, 1979

[51] Int. Cl.³ .............................................. B21H 1/00
[52] U.S. Cl. ...................................... 72/108; 72/121; 72/703
[58] Field of Search ................. 72/104, 108, 120, 121, 72/123, 124, 703

[56] References Cited

U.S. PATENT DOCUMENTS

| | | | |
|---|---|---|---|
| 934,335 | 9/1909 | Nahm et al. | 72/703 |
| 980,197 | 1/1911 | Campbell | 72/703 |
| 1,399,525 | 12/1921 | Schaad | 72/703 |
| 2,294,685 | 9/1942 | Nelson | 72/703 |

*Primary Examiner*—Lowell A. Larson
*Attorney, Agent, or Firm*—Gregory B. Wood

[57] ABSTRACT

A knurling tool has a planar face plate with an orifice for receiving a workpiece therethrough. Slide blocks are slidably mounted in opposing planar slots in the face plate. Each slide block has a slot with a knurl bit mounted therein so that the knurl bits extend into the face plate orifice for pressing against the surface of the work piece. An adjustment screw is provided to adjust each slide block longitudinally along the slot in which it is mounted and to provide a means of forcing the knurl bit against the workpiece surface. A clamping screw is also provided to clamp each slide block in its slot. A machine mounting apparatus is also provided for attaching the tool to a machine such as a milling machine, lathe, or other such machine.

6 Claims, 4 Drawing Figures

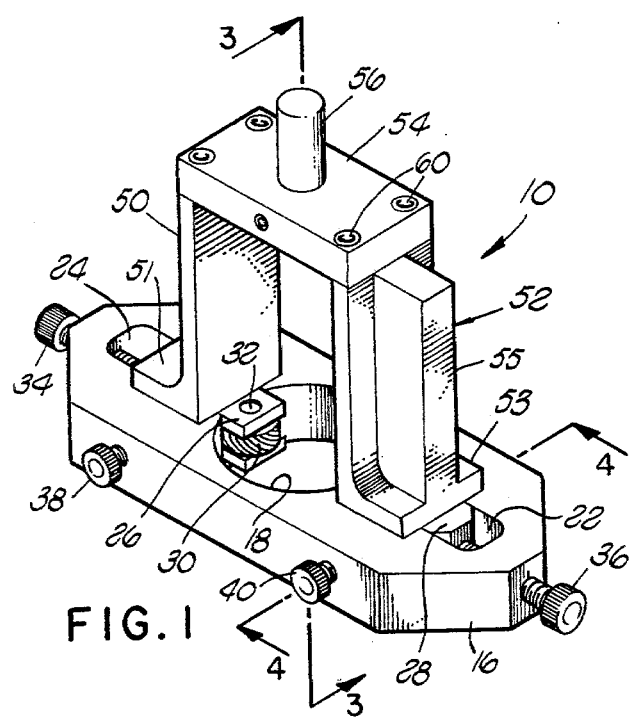
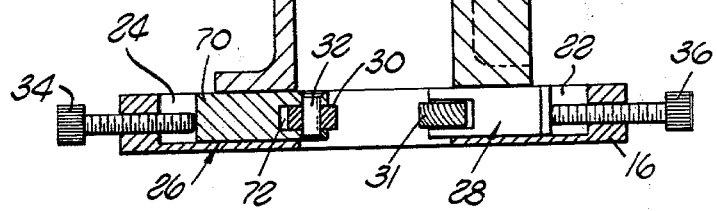

KNURLING TOOL

BACKGROUND OF THE INVENTION

The present invention relates to tools used on power machines and in particular to a novel knurling tool for use on such machines.

Various types of knurling tools, well known in the art, have been used extensively to impress or cut a plurality of grooves in the surface of a workpiece such as bar stock to provide a clip free gripping region along a portion of the bar stock.

Knurling tools have generally been comprised of a jaw-like structure having a base member to which a pair of outwardly extending knurl bit holding members were mounted, in either a movable or immovable manner, to form the jaw-like support structure. Knurling bits were then mounted in the ends of the outwardly extending members. In use bar stock can be fed frontally into the open end of the jaw-like support structure between the knurling bits. Apparatus is then provided to close the outwardly extending members about the end of the bar stock with the knurling bits exerting force against the surface of the bar stock. In an alternative arrangement the bar stock is rotated 90 degrees and fed sideways between outwardly extending members of the jaw-like structure. Thus, the outwardly extending members effectively "bite" around the bar stock along its length. In both arrangements the knurling bits are rotatably mounted in the end portions of the outwardly extending members.

In use, the knurling bits are clamped about the bar stock to exert force against the surface of the bar stock. As the bar stock is rotated, the knurling bits cause a grooved impression to be made in the surface of the bar stock. Thus, whether the knurling tool is a side feed or an end feed type of tool, the knurling bits must be forced against the surface of the bar stock with a substantial force in order that the surface of the bar stock will be impressed with the grooves.

A significant disadvantage of such jaw-like structures has been that the large forces required to make an impression in the surface of the bar stock, particularly when the stock is a hardened steel or other very hard substance, is that the substantial inward forces required to press the knurl bits against the bar stock cause the outwardly extending members to react so that they are forced apart slightly. This slight opening when the large force is applied can cause an improper or undesirable knurling pattern on the surface of the bar stock. In addition, the large forces required frequently cause the bearings of the machine to experience rapid wear.

In order to solve the problem of the jaw opening as the knurling bits are tightened against the surface of the workpiece, various techniques have been tried. The most common has been to simply provide a very rigid jaw-like structure where the forces necessary to open or widen the jaw-like members would be much greater than the force expected to be exerted by the knurling bits against the surface of the bar stock. However, the materials required to be used in making such a rigid structure make the resultant knurling tool quite expensive and quite large.

The present invention overcomes these disadvantages by providing a planar base member with an orifice through which the bar stock is fed. Knurling bits are mounted in planar slots provided in the planar face plate. The knurling bits then extend into the orifice and may be tightened against the surface of the workpiece by tightening screws movable in the plane of the face plate, which exert an inward force against the back of the knurling bit to force the knurling bit towards the center of the orifice and thus against the surface of the bar stock. As used herein, the plane of the planar base plate is a plane having a thickness which is approximately equal to the thickness of the face plate member.

SUMMARY OF THE INVENTION

The knurling tool assembly of the present invention comprises a planar face plate member having a stock receiving orifice therethrough and at least one slot in the plane of the face plate extending from the stock receiving orifice into the face plate. A slide block assembly is then slidably mounted in each of the slots. Each slide block has a first end which extends into the stock receiving orifice. The slide block assembly has a knurl means, such as a knurling bit, rotatably mounted to the first end of the slide block.

Mounting means may be coupled to the face plate member for mounting the knurling tool to a stock working machine, such as a drill press or a milling machine turret if the tool is to be rotated about the bar stock, or to a lathe if the bar stock is to be rotated and the knurling tool held stationary. In a preferred embodiment, the face plate member has two opposing slots each having a slide block assembly slidably mounted therein. The knurl means of the slide block assemblies are then disposed to extend into the stock receiving orifice for exerting a force against a workpiece. The forces exerted by the respective knurl means are then exerted in opposite directions along the same axis on opposite sides of the workpiece.

The knurling tool may also comprise means for adjusting the position of each slide block along the slot and for pressing the slide block knurling means against the surface of the workpiece. Means may also be provided for selectively locking each slide block for preventing it from sliding along the slot in which it is mounted.

In operation, the plane of rotation of the knurling bit mounted to the slide block is in the plane of the planar face plate member.

BRIEF DESCRIPTION OF THE DRAWINGS

A complete understanding of the present invention and its advantages may be gained from a consideration of the following description of the preferred embodiments taken in conjunction with the accompanying drawings in which:

FIG. 1 is a perspective plan view illustrative of the present invention;

FIG. 2 is a bottom plan view of the knurling tool assembly as shown in FIG. 1;

FIG. 3 is a side plan view through section 3—3 of FIG. 1; and

FIG. 4 is an end plan view through section 4—4 of FIG. 1.

DETAILED DESCRIPTION

Referring to FIG. 1 an illustrative embodiment of the knurling tool assembly of the present invention is shown comprising a face plate 16 having a stock receiving orifice 18 therethrough. A pair of oppositely disposed slide block slots 22 and 24 extend from the stock receiving orifice 18 into the face plate 16. The slots 22 and 24 are provided in the plane of the face plate 16 and may be open sided slots as illustrated in FIG. 1 or may be enclosed passageways drilled to extend into the body of the face plate 16. A first slide block 26 is positioned to be slidable in the slot 24 and a second slide block 28 is positioned to be slidable in the slot 22.

The slide blocks of the invention preferrably have a base member 70 with a slot 72 in one end as illustrated in FIG. 3. An axle receiving hole is then drilled through the slotted end of the base member 70 transverse to the direction of the slot. A knurl bit 30 is then positioned in the slot 72 and is rotatably attached to a knurl axle 32 extending through the transverse axle receiving hole in the slotted end of the base member 70. The peripheral surface of the knurl is provided with cutting or impressing teeth with a portion of the peripheral surface extending beyond the slotted end of the base member 70.

In the preferred embodiment, the slide blocks 26 and 28 are mounted so that the respective knurls 30 and 31 have a plane of rotation which is coincident with the plane of the face plate member 16.

Referring to FIGS. 1 and 3, a slide block adjustment screw 34 is provided in a threaded hole extending from the outer edge of the face plate 16 into the slide block slot 24 and preferably along the longitudinal axis of the slide block slot 24. The slide block adjustment screw 34 is then provided to exert force against the end of the slide block 26 remote from the end to which the knurl bit 30 is mounted.

In a similar fashion a slide block adjustment screw 36 is provided to extend from the outer edge of the face plate 16 into the slot 22 through a threaded hole so that a force can be applied to the end of the slide block 28 remote from the knurl 31 when the slide block adjustment screw 36 is screwed inwardly.

In an alternative arrangement, the distance between the knurl bits of the respective slide blocks may be adjusted by simply providing spacers, preferably made of hardened metal, in the slots behind the slide blocks or providing a plurality of slide blocks having differing lengths. In such an arrangement the adjustment screws can be eliminated.

Referring to FIGS. 1 and 4, the slide block may be locked in place by providing a slide block lock screw 38 in a threaded hole extending into the slide block slot 24 and transverse to the longitudinal axis the slot 24. By tightening the slide block lock screw 38, the slide block 26 is clamped between the end of the slide block lock screw 38 in the slot 24 and the interior longitudinal wall of the slot 24 opposite the wall through which the lock screw 38 extends.

In a similar manner, a slide block lock screw 40 may be provided to clamp the slide block 28 in the slot 22. The particular clamping mechanism is illustrated in FIG. 4 where the lock screw 40 is screwed into a threaded hole 41 extending from the outer edge of the face plate 16 in a direction transverse to the longitudinal axis of the slot 22 to press against one longitudinal edge of the slide block 28. The slide block 28 is then clamped against the side of the slot 22 opposite the threaded hole 41 when the lock screw 40 is screwed inwardly. As can be seen from FIG. 3, the length of each of the slide blocks 26 and 28 is less than the diameter of the stock receiving orifice.

The knurling tool may also be provided with a means for attachment to the machine. For example, the mounting apparatus may comprise a first side support 50 having a base portion 51 which is mounted to the surface of the face plate 16 to extend across and cover the slot 24. The side support member 50 may be attached to the surface of the face plate 16 by a plurality of face plate mounting screws 62 as illustrated in FIGS. 2 and 4. The plurality of face plate mounting screws are screwed into the bottom of the face plate 16 and extend into the base portion 51 of the side support 50.

In a similar manner a second side support member 52 may also have a base portion 53 which is mounted to the surface of the face plate 16 to cover the open slot 22. The side support 52 is attached utilizing face plate mounting screws 62 extending through the thickness of the base plate 16 and into the base 53 of the side support 52. One of the side supports, such as side support 52, may be provided with a holding flange 55 to provide a means by which the tool may be held by a machine. For example, if the bar stock is to be rotated by a machine such as a lathe, then the holding flange 55 is clamped to the lathe by a tool holding apparatus of the lathe. The lathe tool holder is then adjusted so that the bar stock extends through the stock receiving orifice 18 of the knurling tool.

Because the slide blocks are mounted in the planar volume of the face plate 16, and because the structure of the present invention permits the slide blocks to be held substantially immovable despite the forces which are applied to slide block by the adjustment screws 34 and 36, the present invention provides superior knurling capability because there are no jaw-like, outwardly extending member which will be spread apart by the inward force applied to the slide blocks to impress the surface of the bar stock. In addition, because the impressing forces are applied and act only in the plane of the planar base plate, all reaction forces also occur in the plane of the face plate and are thus totally absorbed by the face plate. Such reaction forces are therefore not applied against machine bearings as in some prior art knurling tools and machine bearing wear is therefore not increased.

A tail stock mounting block 54 may be provided to be screwed into the ends of the side supports 50 and 52 utilizing screws 60 as illustrated in FIGS. 1 and 4. A rotation mount member 56, preferably of a generally cylindrical cross section may then be attached to the center of the tail stock mounting block 54 in coaxial relationship with the central axis of the stock receiving orifice 18. In such an arrangement, the knurling tool 10 may be attached to a drill press or milling machine spindle whereby the entire knurling tool 10 is rotated about a piece of stationary bar stock. Thus, the knurling tool of the present invention may be held stationary utilizing the holding flange 55 or may be rotated about a piece of bar stock by utilizing a rotation mount member 56.

Of course, it will be appreciated that any other mounting means may be utilized without departing from the spirit of the invention. Furthermore, it will be appreciated that when the knurling tool is being held by the holding flange member 55, the upstanding side support 50 and tail stock mounting block 54 may be eliminated. Of course, some means must then be provided to keep the slide block 26 in the slot 22 during the knurling operation. In a configuration where at least the tail stock mounting block 54 is removed, the present invention provides a significant advantage in that a knurl may be placed along the entire surface of a relatively long piece of bar stock because there is no mounting block to oppose the end of the bar stock as it extends through the stock receiving orifice 18.

While the present invention has been particularly described with reference to the preferred embodiments, it will be understood by those skilled in the art that various changes in form and details may be made without departing from the spirit and scope of the invention.

What is claimed is:

1. A knurling tool assembly for impressing a piece of stock using a stock working machine comprising:
   a planar face plate having a stock receiving orifice of a preselected diameter therethrough and further having a pair of angularly cross-sectioned slots extending from the stock receiving orifice into the planar face plate in the plane thereof;
   a pair of interchangeable slide blocks, each slide block being slideably positioned in a different one of the slots and having a length along the slot which is less than the diameter of the stock receiving orifice, each slide block having a first end extending into the stock receiving orifice;
   a pair of knurls each knurl rotatably mounted in the first end of a different one of the slide blocks; and
   machine mounting means attached to the face plate for mounting the knurling tool to the stock working machine.

2. The knurling tool of claim 1 further comprising means for exerting a force against the other end of each slide block for adjustably sliding each slide block in its slot for urging the knurl mounted in the one end of each slide block against the surface of the workpiece extending through the stock receiving orifice.

3. The knurling tool of claims 1 or 2 further comprising locking means for selectively locking the slide blocks in their respective slots for preventing them from sliding out of their respective slots.

4. A knurling tool assembly for impressing a piece of stock using a stock working machine comprising:
   a planar face plate having a stock receiving orifice of a preselected diameter therethrough and further having a pair of angularly cross-sectioned slots extending in opposite directions from the stock receiving orifice into the planar face plate in the plane thereof;
   a pair of slide blocks, each slide block being slideably mounted in a different one of the slots, each slide block having a first end extending into the stock receiving orifice;
   a pair of knurls, each knurl rotatably mounted in the first end of a different one of the slide blocks, and
   machine mounting means attached to the face plate for mounting the knurling tool to the stock working machine.

5. The knurling tool of claim 4 further comprising means for exerting a force against the other end of each slide block for adjustably sliding each slide block in its respective slot for urging the knurl mounted in the one end of each slide block against the surface of the workpiece extending through the stock receiving orifice.

6. The knurling tool of claims 4 or 5 further comprising locking means for selectively locking the slide blocks in their respective slots for preventing them from sliding out of their respective slots.

* * * * *